(12) United States Patent
Viola (10) Patent No.: US 7,498,056 B2
(45) Date of Patent: Mar. 3, 2009

(54) METHOD FOR RECONDITIONING AIR CONVEYING OR PROCESSING DUCTS

(75) Inventor: Francesco Viola, Pianiga (IT)

(73) Assignee: Francesco Griggio, Padua (IT)

( * ) Notice: Subject to any disclaimer, the term of this patent is extended or adjusted under 35 U.S.C. 154(b) by 0 days.

(21) Appl. No.: 11/249,734

(22) Filed: Oct. 14, 2005

(65) Prior Publication Data

US 2006/0099905 A1  May 11, 2006

(30) Foreign Application Priority Data

Oct. 15, 2004  (IT) .......................... PD2004A0256

(51) Int. Cl.
*B05D 7/22* (2006.01)
*B05D 3/12* (2006.01)

(52) U.S. Cl. .......................... 427/238; 427/8; 427/235; 427/236; 427/294; 427/386

(58) Field of Classification Search ....................... None
See application file for complete search history.

(56) References Cited

U.S. PATENT DOCUMENTS

| | | | | |
|---|---|---|---|---|
| 4,327,132 A * | 4/1982 | Shinno | .......................... | 427/235 |
| 4,780,333 A * | 10/1988 | Smith et al. | .................. | 427/236 |
| 5,045,352 A | 9/1991 | Mueller | | |
| 5,287,867 A | 2/1994 | Plummer et al. | | |
| 5,314,719 A * | 5/1994 | Batdorf et al. | ............ | 427/385.5 |
| 5,980,984 A * | 11/1999 | Modera et al. | ............... | 427/237 |
| 6,047,714 A | 4/2000 | Akazawa | | |
| 6,423,152 B1 | 7/2002 | Landaas | | |
| 2003/0138558 A1* | 7/2003 | Wang et al. | .................. | 427/230 |

FOREIGN PATENT DOCUMENTS

| | | |
|---|---|---|
| DE | 198 27 571 A1 | 12/1999 |
| WO | WO 01/17700 A1 | 3/2001 |
| WO | WO 2005/049239 A1 | 6/2005 |

* cited by examiner

*Primary Examiner*—William Phillip Fletcher, III
(74) *Attorney, Agent, or Firm*—Browdy and Neimark, P.L.L.C.

(57) ABSTRACT

The method for reconditioning ducts in air conveying or processing networks envisages generating an air flow with maximum turbulence between two openings of the duct sections to be treated. An aerosol is then generated inside the airflow, consisting of a film-forming product with liquid droplets of predetermined average size, in the vicinity of an upstream section of the duct to be treated relative to the direction of movement of the air flow. The droplets containing polymer precursors are deposited on the inner surface of the duct forming a liquid film which, after a crosslinking step, results in the formation of a uniform and continuous solid coating. Measurement data identifying the geometric form of the duct to be treated are converted during a calculation step performed using a model into at least one pair of values for the flowrate and average size of the droplets, respectively.

12 Claims, 6 Drawing Sheets

METHOD FOR RECONDITIONING AIR CONVEYING OR PROCESSING DUCTS

DESCRIPTION

1. Technical Field

The present invention relates to a method for reconditioning air conveying and processing ducts.

The method in question is intended to be used advantageously for coating and sanitizing ducts of any geometric shape and size, intended to convey air in particular in distribution networks for ventilation, heating and air-conditioning plants in both civil and industrial environments.

2. Background Art

As is known, the problem of ensuring the hygienic condition of the ducts used in air distribution and processing plants is of particular importance in the sector in question, since in domestic and working environments the air breathed is more and more frequently processed beforehand by special plants and conveyed along special ducts.

In order to control the quality of the indoor air inside premises it is necessary ensure the correct cleanliness and hygienic condition of the air distribution ducts.

The causes of contamination affecting the ducts may be attributed to many factors such as dust which is freely present in the air, micro-organisms and fungi which develop inside the ducts, residual traces of lubricating oil, earth and debris of various kinds resulting from the construction, transportation, storage on-site and installation of the ducts, bird droppings, insects, etc.

The ducts of air treatment plants may, in particular where moisture is present, be the source of infections of bacterial origin since they favour the creation of environmental conditions suitable for the proliferation of epidemic sites of bacterial colonies.

In order to limit the risk associated with the outbreak of bacterial epidemics due, for example, to the *Legionella* germ responsible for diseases which may also be of a very serious nature, in the interests of public health, the competent legislative bodies in various countries have issued instructions, directives or simple guidelines which must be observed during the design and maintenance of air processing plants.

A duct may be regarded as clean only when all its surfaces are free from the presence of contaminants which are considered to be unacceptable, the term "contaminants" being understood as meaning any undesirable deposition on the surfaces of the ducts, whether it be particles or bacterial colonies.

Therefore, on the one hand, the accumulated particles must not exceed the maximum values, for example of 1-20 $g/m^2$ stipulated by the various regulations in this area and, on the other hand, the maximum limits as regards mycotic and bacterial levels must not be exceeded. For example, in the case of the latter, the NADCA (National Air Duct Cleaner Association) considers ducts to be clean if the bacterial level is less than 30,000 CFU/g (colony forming units/gramme) and the mycotic level is less than 15,000 CFU/g.

In order to comply with these growing number of requirements, several different methods for maintaining or sanitizing the air-conveying ducts associated with air processing plants intended for ventilation, heating or air-conditioning have been developed.

Below the term "sanitization" is understood as referring generically to all those operations involving maintenance of the surfaces of ducts and intended to remove contaminating deposits and perform the cleansing, sterilization and elimination of contaminating bacterial agents.

Traditionally, sanitization methods of the known type are based on an action involving mechanical loosening of the contaminant from the ducts and then subsequent removal, for example by means of suction.

More particularly, known sanitization methods involve the use of:

systems for removal of the contaminant by means of suction, acting directly in contact with the surface of the duct to be sanitized;

systems for blowing in air or other fluids against the surface of the duct to be sanitized;

systems comprising brushes acting on the surface of the duct to be sanitized.

The United States patent U.S. Pat. No. 5,072,487 describes, for example, a technique for mechanical removal of the layers of particle matter contaminating the ducts, using a motorized apparatus able to move along the actual ducts.

German patent DE 19827571 describes a system for distributing a disinfecting product which is sprayed inside a duct along which an air flow passes, distribution of the product being performed by an atomization nozzle which is mounted directly on a carriage which moves along the duct.

French patent FR 2,753,629, describes a method and an apparatus for sanitizing ducts where there is limited access, as in the case of lifts or air ducts, which uses a liquid product which is distributed in atomized form by a plurality of nozzles distributed along the said duct.

All these methods of the known type, however, have been unable to achieve an optimum quality of cleaning of the ducts and in practice have proved to be complicated, impractical and costly.

In the present state of the art efforts have also been directed towards solving the problem of sealing leakages in air conveying ducts by means of the introduction of an aerosol of solid resin droplets inside a main air flow which flows inside a duct such that the droplets of atomized resin solidify immediately and cover up and close the unwanted openings responsible for the air leaks.

In this case the air flowrate decreases gradually as the openings are closed and consequently the difference in pressure between the inside and the outside of the duct increases. The average size of the solidified droplets, the difference in pressure maintained between the inside and outside of the duct as well as the replenished air flow conveyed inside the said duct are defined so as to optimize the efficiency of deposition of the solid resin droplets in the vicinity of the openings and allow the resin itself to form sealing bridges on top of the said openings.

This method does not allow any sanitization of the ducts to be performed and envisages, on the one hand, controlling deposition of the droplets of resin by means of variables which are difficult to manage such as the pressure; on the other hand, it is not concerned with the interaction between the droplets of resin and the contaminants present on the surface of the ducts.

DISCLOSURE OF THE INVENTION

In this situation the problem underlying the present invention is therefore that of eliminating the problems of the known art mentioned above by providing a method for reconditioning air conveying or processing ducts which is able to improve in an extremely effective manner the hygienic condition of the ducts associated with the surface accumulation of particles as well as mycotic and bacterial presence in contact with the flow conveyed inside the said ducts.

A further object of the present invention is to provide a method for reconditioning ducts which is simple and inexpensive to implement and operationally entirely reliable.

These objects, together with others, are all achieved by the method for reconditioning air conveying or processing ducts according to the present invention, which comprises the following operating steps:

a step involving selection of at least one duct section to be treated, situated between at least one first and one second opening;

a step involving closing of any openings in communication with the duct section to be treated and different from the first opening and second opening;

at least one step involving generation, by ventilation means, of a flow of conveying air with maximum turbulence and a predefined flowrate flowing between the first opening and the second opening, whereby the step involving closing of the openings results in said air flow not being influenced by openings situated between the first and second opening.

According to the invention the method is characterized in that it envisages:

at least one step involving generation, by means of atomization means, of an aerosol consisting of a film-forming product having liquid droplets of predetermined average size, within the air flow in the vicinity of an upstream section of the duct to be treated relative to the direction of movement of the air flow;

a step involving deposition of the droplets of product, still in the liquid phase, onto the inner surface of the duct section to be treated with formation of a substantially uniform and continuous liquid film;

a step involving crosslinking of the liquid film with formation of a substantially uniform and continuous solid coating.

BRIEF DESCRIPTION OF THE DRAWINGS

The technical features of the invention, in accordance with the abovementioned objects, may be clearly determined from the contents of the claims indicated below and the advantages thereof will emerge clearly in the following detailed description, provided with reference to the accompanying drawings which show a purely exemplary and non-limiting embodiment and in which:

DETAILED DESCRIPTION OF A PREFERRED EXAMPLE OF EMBODIMENT

The invention relates to a method for reconditioning ducts in air conveying and/or processing plants of any kind such as, for example, ventilation, air-conditioning and heating plants, etc.

In more detail, the method in question allows the production of a continuous and uniform coating of film-forming product over all the inner surfaces of the walls of the ducts, able to renovate and sanitize the interface between the ducts and the air fluid conveyed inside them, by covering the deposits of contaminants which have accumulated during operation (dust and the like) and neutralizing any bacteria which may be present in them.

With the method according to the present invention it is possible to control in a precise manner the process of deposition of the film-forming product inside the treated ducts, making it possible to achieve remote coating of the inner surface of the said ducts, whatever their geometric form, with a degree of continuity (namely with distribution over all the surfaces of the duct) and with a degree of uniformity (namely with distribution from the start to the end of the duct), as well as with a thickness of the layer of the film-forming product, in accordance with the values required by the specific applicational requirements.

The film-forming product may advantageously consist of a formulation containing polymer precursors, in particular based on epoxide compounds, or any other product able to produce a coating adhering to the inner surface of the ducts, without thereby departing from the scope of protection of the present patent.

The method uses wall deposition of liquid droplets of film-forming product, suspended in the air, promoted by the turbulence of the air which conveys and keeps the said droplets suspended.

It is envisaged using a mathematical model for deposition of an aerosol in an air flow with maximum turbulence, or a simple experimental model, able to determine the effect of variation of the physical parameters influencing the turbulent deposition phenomenon, such as the air flow, average size of the aerosol droplets, and predict the outcome of the process involving coating of a duct with a given geometric form, evaluated in terms of deposition efficiency, uniformity of coating obtained, distribution of the thicknesses of the coating achieved and amount of product used.

Using this model, knowing the geometric form and the dimensions of the duct to be coated, as well as the average thickness of the coating to be produced, it is possible to obtain the values of the operating parameters which ensure formation of the desired coating, namely principally: air flowrate, size of the aerosol droplets, amount of product used, duration of the treatment.

Below an example of a model will be provided in the form of graphs by means of which, on the basis of the data relating to the geometric form of a duct, the abovementioned pairs of values for the air flowrate and droplet size may be obtained.

In accordance with a non-limiting example of embodiment the method according to the present invention will be illustrated below with reference to an air distribution network in a ventilation, heating and air-conditioning plant of an office building.

Figure 1:
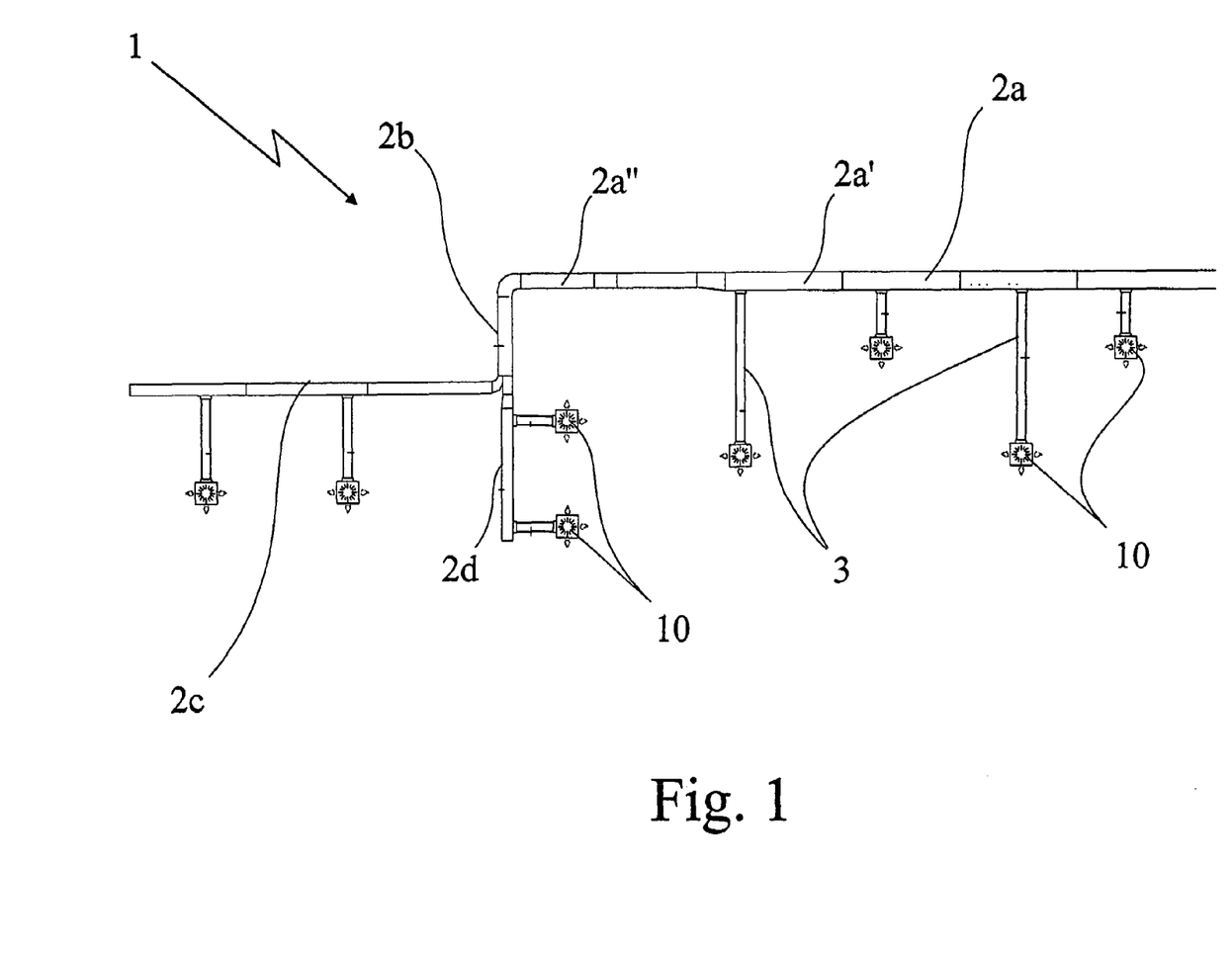
FIG. 1 shows a schematic view of an air distribution network able to be treated with the method according to the present invention.

With reference to the accompanying drawings, 1 denotes in its entirety the air distribution network which is composed of a main duct 2 divided into several sections 2a, 2b, 2c and 2d and secondary ducts 3 which terminate in air distribution outlets 10 inside the premises to be served.

Preferably, with the method in question it is possible to coat effectively about ten meters of duct at a time, for which reason, during programming of the operation, the air distribution network is ideally divided up in succession into individual duct sections to be treated.

Therefore, initially it is envisaged performing a step involving selection of at least one first duct section to be treated as well as a recognition step for acquiring the measurement data indicating its geometric form, namely its cross-section and its length.

In the case examined it is assumed that a first section 2a-2c of the main duct 2 is to be treated, said section extending over a length of nine meters and having a rectangular cross-section of 300×200 mm.

In this case the duct section 2a-2c considered does not have a constant cross-section along its entire length and therefore the calculation model must take into consideration an average cross-section which allows optimization of the deposition process for all the different duct portions. In the case of the example illustrated in FIG. 2, the duct section 2a-2c examined has been shown shaded and is formed by a first portion 2a', a second portion 2a'' having a cross-section smaller than that of the first portion 2a', a third portion 2b having a cross-section the same as that of the second portion 2a'' and a fourth portion 2c having a cross-section smaller than that of the third portion 2b.

Two openings are also identified in the network, namely a first and a second opening indicated in the figures by the numbers 4 and 5, respectively, and intended to allow circulation of an air flow, as will be clarified below.

At this point, a step involving closing of the all the openings in communication with the abovementioned duct section 2a-2c, other than those openings identified above as first and second opening, is performed.

Closing may be performed using special plugs 6 (for example inflatable plugs to be inserted directly into the ducts as indicated by the hatching in the drawing) which in the example shown in the accompanying figures will be provided at all the outlets 20 for introducing air into the premises.

Once the air distribution network is completely sealed, a step involving generation, by ventilation means, of a turbulent air flow with a substantially constant predetermined flowrate between the first opening 4 and the second opening 5 will be performed.

For this purpose, in the example a ventilating unit 7 has been connected to the air distribution network 1 in a position situated upstream of the duct section 2a-2c to be coated. Advantageously, the unit 7 may be connected to the network in the vicinity of the air treatment unit of the air-conditioning plant or in the vicinity of the specific branch of the air-conveying network to be treated.

The flow which is provided is an air flow with maximum turbulence, the expression "maximum turbulence" being understood as meaning a flow which is distinguished by a Reynolds number Re>10,000.

In this connection it is pointed out that the Reynolds number is commonly defined as the ratio between the product of the hydraulic diameter of the duct $D_h$ times the average speed U with which the air flows inside the duct, and the value v of the kinematic viscosity of the air: $Re=(D_h U/V)$.

In other words, the speed and dimensions of the duct are closely associated with each other so as to provide a turbulent flow which allows optimum deposition of the droplets on the walls.

The outlet opening 5 for the air is situated downstream of the duct to be coated, so as to define a circuit for the air processed by the ventilating unit 7, which passes through the duct to be treated (shaded in the drawing).

Once the air-conveying circuit has been defined, it is envisaged performing a step involving generation, by atomization means 8, of an aerosol consisting of a film-forming product comprising liquid droplets of predetermined average size, within the air flow with maximum turbulence.

Introduction is performed in the vicinity of an upstream section of the duct to be treated 2a relative to the direction of movement of the air flow.

The atomization means, indicated generically by 8 in the figure, comprise in greater detail a mobile unit 8'' for preparation of the product, connected to at least one gun 8' equipped with one or more atomizer nozzles for generating the aerosol within the air flow.

This step involves the provision of a mounting element inside the duct for installation of a flange specifically designed to allow perfect mating with the gun. Once sanitization treatment using the method in question has finished, the flange is left in position, without altering the operating capability and performance of the duct, thus allowing future operations and permitting visual inspection of the channels.

Advantageously, each gun will have the form of a wing profile and have internally the hydraulic circuitry necessary for supplying atomizer nozzles.

The latter are modular units which are designed for connection to the gun by means of rapid connection so as to allow preparation of the spraying configuration most suited to the geometric form and the size of the duct to be treated.

In this way, since the gun has a large number of connections to which the nozzles may be connected, a spraying unit which is extremely flexible in terms of spraying geometry, and particular versatile, allowing optimum rapid preparation during operation, is obtained.

The guns are inserted inside the ducts preferably from the bottom and so as to keep the nozzles aligned with the duct.

The mobile aerosol generating unit, of which the spray gun forms part, is in effect a transportable plant for generating aerosol with droplets of adjustable average size. By suitably adjusting the operating parameters of the unit, i.e. volumetric flowrate of the film-forming product and pressure of the compressed gas used during spraying—it is possible to produce atomization of the film-forming liquid in an aerosol with a known average size of the component droplets, namely it is possible to produce a polymeric aerosol consisting of droplets, the average size of which is equivalent to a predefined value.

In more detail, the mobile aerosol generating unit consists operationally of two devices, one of which is intended to define the circuit for the film-forming product and the other for defining the circuit of the compressed gas, i.e. the propellant for atomization, inside the nozzles, of the film-forming product.

With reference to the circuit intended for the film-forming product, an atmospheric pressure tank for the contents of the film-forming product and a volumetric pump driven by means of an inverter and supplied by the tank are provided. By varying by means of the inverter the frequency of the power supply current of the electric motor of the volumetric pump, effective adjustment of the volumetric flowrate of product in the nozzle supply circuit is obtained. A mechanical filter for the fluid with a coating action is inserted downstream and upstream of the pump in order to prevent encrustations or foreign bodies from entering the pump body or from being subsequently conveyed towards the atomizer nozzles. A pressure gauge is installed downstream of the filter on the delivery side, for controlling the operating pressure of the circuit which is closed, upstream of the spray gun supply pipe, with a liquid side supply manifold.

The circuit intended for the gas used for spraying of the film-forming product is arranged so as to be connected to different supply sources. It has a supply manifold to which a high-capacity compressor or a high-pressure tank for gaseous nitrogen may be equally well connected. Downstream of the supply manifold there is a mechanical filter, a high-precision pressure regulator and a precision pressure gauge for verifying the value of the operating pressure (gas side) of the aerosol generating unit. A gas side delivery manifold is installed downstream of the precision pressure gauge, the gas line of the supply pipe of the spray gun being connected thereto.

The atomizer nozzles used, to which the two circuits for the film-forming fluid and the gas are connected, are suitable for spraying viscous and cloying fluids.

By means of these nozzles it is therefore possible to perform atomization of the liquid product followed by deposition of the liquid droplets of film-forming product on the inner surface of the duct section to be treated with formation of a substantially uniform and continuous liquid film. The terms "uniform and continuous" are understood as referring to a coating which extends both along the whole duct section to be treated and over all the walls of the duct, namely if the latter has, for example, a rectangular cross-section, over the two side walls, the bottom and the top of the duct.

The liquid film thus obtained is suitable for impregnating and covering in an optimum manner all the contaminating deposits which adhere to the walls of the duct at the time of the reconditioning treatment.

This is subsequently followed by a polymerization step with crosslinking of the product which forms the liquid film, resulting in the formation of a substantially uniform and continuous solid-state coating. This step may last for a solidification period which may have a duration of even several hours. During this time period, any subsequent deposition of droplets of film-forming product which might be necessary (for example following undesirable interruptions in the deposition process) would occur on the previous film which is still liquid, or partially liquid, and would result in combined crosslinking of all the product deposited on the inner surface of the duct section to be treated.

In order to reduce the solidification period favouring crosslinking of the liquid product on the inner surface of the duct, it will be possible to envisage one or more steps for drying the liquid film by means of generation of a flow of drying air inside the duct advantageously at a temperature higher than that envisaged for the previous flow of conveying air.

It must be pointed out here that the formation of an aerosol consisting of droplets in the solid phase, or in the liquid phase with droplets which should, however, dry or solidify rapidly so as to reach in any case the deposition surface of the duct maintaining substantially unchanged their form, would not be able to ensure impregnation and encapsulation, in a surface coating, of the contaminants deposited on the said deposition surface.

Moreover, it is equally important to note that the solid resin coating which forms as a result of crosslinking on the surface of the duct has mechanical properties such that it is able to have, on the one hand, a self-supporting action inside the duct and, on the other hand, withstand the operating air flow of the plant without being freed into the air and without releasing the coated contaminants.

On the other hand, an aerosol formed by droplets which solidify before reaching the walls of the duct, in addition to not ensuring optimum adhesion and covering of the contaminating deposits, would not have sufficient mechanical strength since the individual droplets, already solidified, would form between them only bonds weaker than those formed by crosslinking in the liquid phase.

A film-forming product which has surprisingly proved to be particularly suitable for satisfying the abovementioned requirements is, as mentioned above, the family of epoxide components.

According to the invention it is therefore envisaged performing a calculation step by means of which the measurement data identifying the geometric form of the duct to be treated is converted using a model into at least one pair of values for the flowrate and average droplet size, respectively, able to ensure a uniform and continuous covering of the inner surface of the duct to be treated.

Consequently the abovementioned air flow generating step and the abovementioned aerosol generating step are performed by defining the pair of values for flowrate and average droplet size, respectively, determined using the calculation model on the basis of the measurement data of the duct.

The air flowrate is kept constant and its value, equal to the nominal value, is ensured by the regulating and modulating system installed on the ventilating unit.

The term "constant" is understood as meaning that the flow does not vary as a result of deposition of the aerosol and that it may also consist of a pulsed flow. In any case, the suction power may vary to take account of the drop in pressure due to gradual blockage of the filter system and purification of the waste gas from the discharge manifold which will be described below.

Upstream of the impeller of the ventilating unit there is installed a device for measuring the flowrate produced by the machine, based on a detection system, for example of the Wilson grid type (sensors for differential measurement of the pressure, associated with a precision pressure gauge), while an inverter is used to set the operating point of the ventilator in order to obtain the exact nominal flowrate independently of the resistance of the plant downstream of the ventilating unit. Setting of the power supply frequency of the electric motor of the ventilating unit, and therefore the actual modulation of the ventilating action, may be performed manually by means of direct control of the inverter or automatically by means of an electronic control unit managing the inverter and the transceiver control system of the pressure gauge unit.

Likewise, once the spray gun has been installed inside the duct, it is sufficient to set operation of the mobile aerosol generating unit to the values provided by the calculation model.

These settings of the ventilating unit and the aerosol generating unit may be performed manually, but in a more practical manner automatically by means of a control logic which, depending on the geometric form and size of the duct to be treated, sets operation thereof to the optimum running values.

The equipment for implementing the method in question was developed so as to be able to recreate, within the treated duct, the turbulence and atomization conditions which ensure deposition of the film-forming product such as to produce formation of the nominally calculated coating.

The equipment may be divided up into three different operating units: the modulating/ventilating unit 7, the polymer aerosol generating unit 8 and a discharge manifold for cleaning the exhaust process air and for separating the waste aerosol.

The latter unit, which is generically indicated by 9 in the accompanying figures, is used to perform cleaning of the air flow leaving the network, ensuring removal of the substances suspended within it before expulsion externally into the atmosphere.

Figure 2:
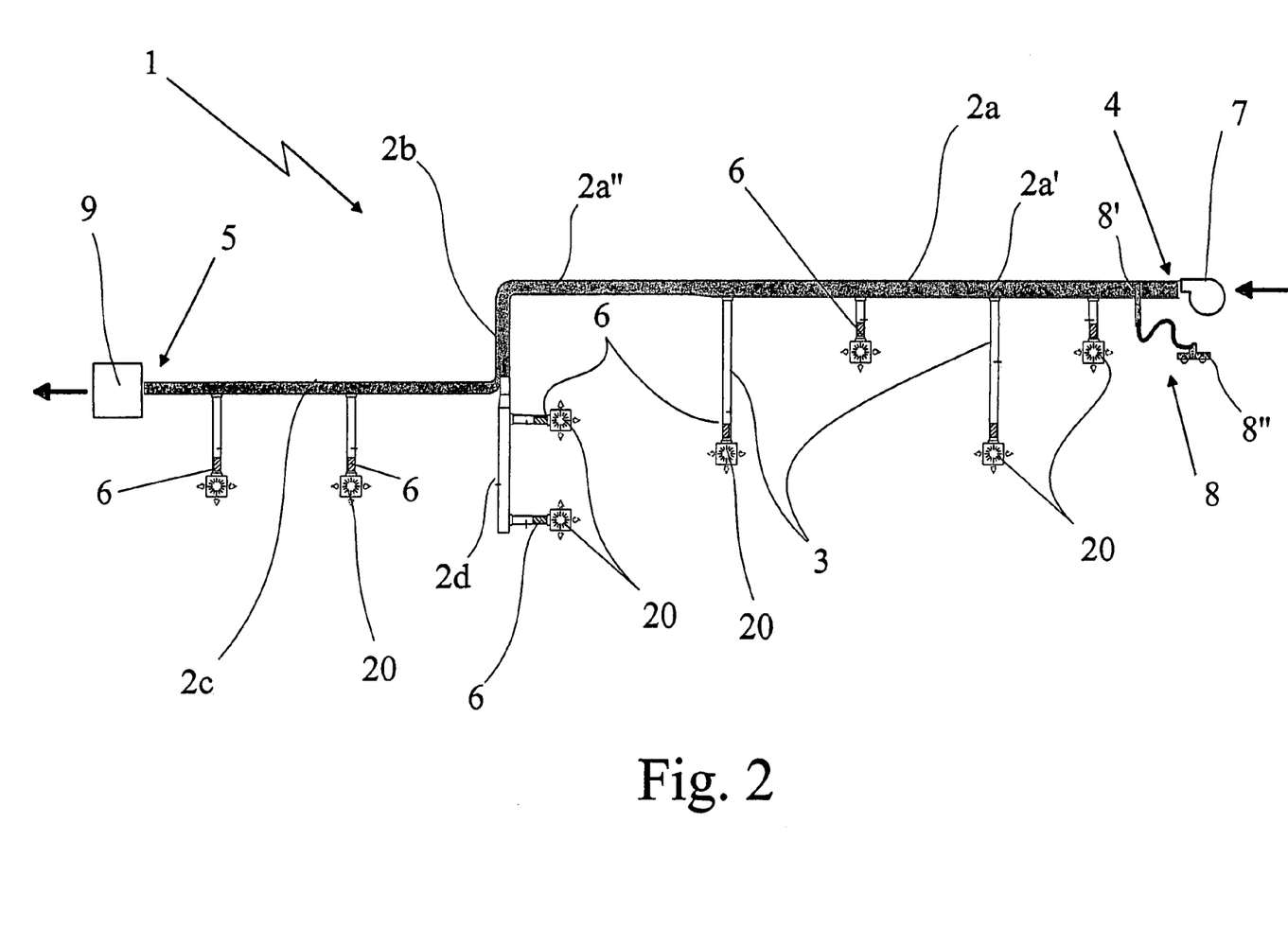
FIG. 2 shows the network of FIG. 1 in which a first section of the duct to be treated with the method according to the present invention has been selected.
Figure 3:
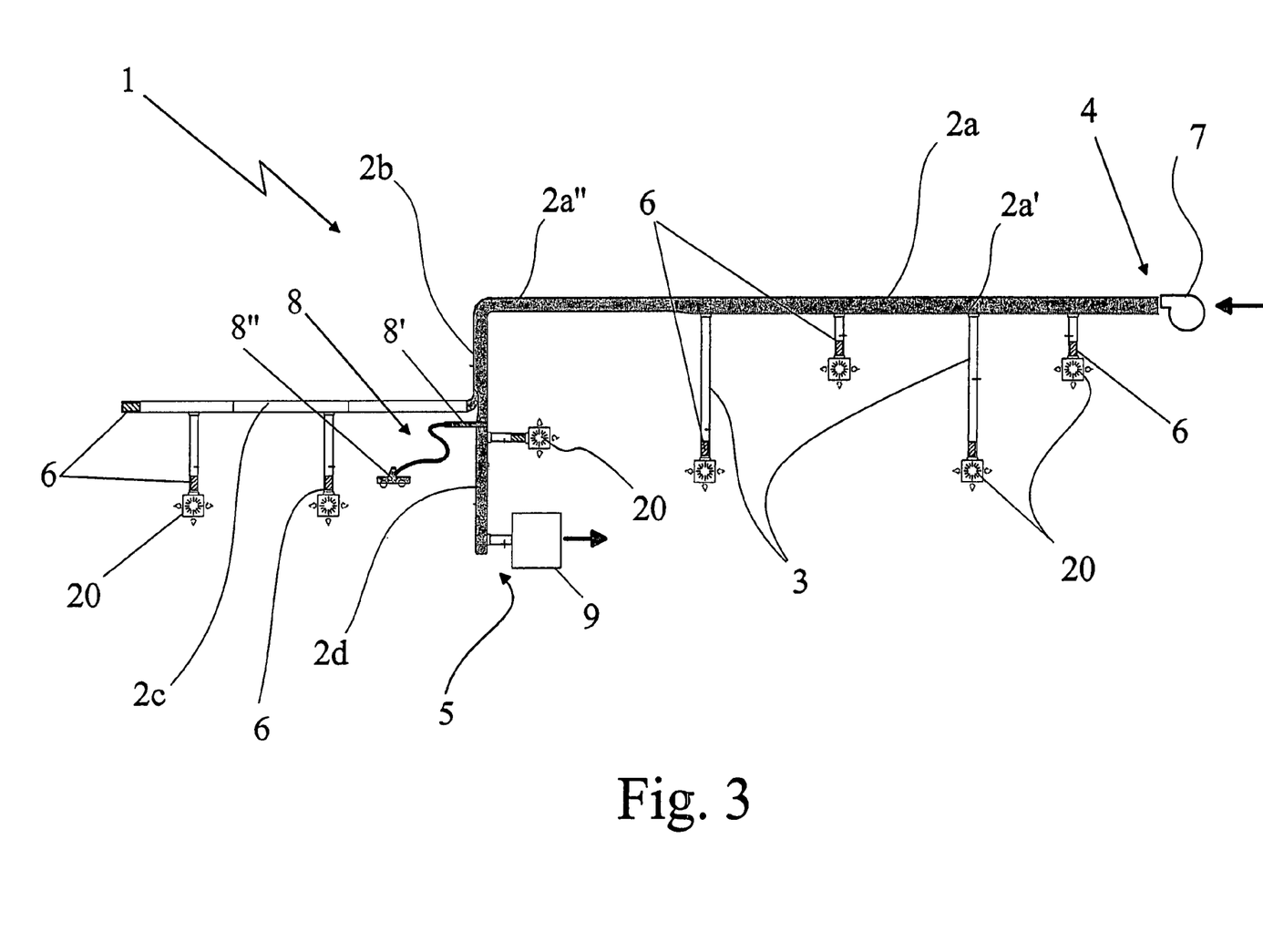
FIG. 3 shows the network of FIG. 1 in which a second section of the duct to be treated with the method according to the present invention has been selected.

In greater detail, in accordance with the example shown in FIGS. 2 and 3, said unit is connected to the outlet opening 5 and consists of a mobile manifold for the discharge air, equipped with an air washer, a droplet separator and an air filter which performs removal of the residual traces of aerosol in the exhaust air before the latter is released into the external environment, in order to prevent contamination of the premises.

Alternatively, it may simply consist of a filter arranged in the region of the outlet opening 5 and having sufficiently small meshes to trap the droplets of coating film suspended in the air flow, namely all the particles of contaminants transported by the latter during treatment of the duct.

The air flow is directed, in accordance with the example illustrated in the accompanying figures, from the delivery of the ventilating unit 7 to the outlet opening which supplies the discharge manifold.

In accordance with a preferred embodiment of the method according to the present invention (not shown in the accompanying figures) the ventilating unit 7 may operate in suction mode, removing the air from the opening 5 and then expelling it via the opening 4 where the discharge manifold will be arranged.

Advantageously, in accordance with this latter embodiment, the duct to be treated is subject to vacuum conditions. Consequently, in the case where small fissures or defective joints are present in the duct to be treated, only a small amount of air is able to enter from outside inside the duct.

With this solution, there is absolutely no risk of leakage of aerosol, dust or other contaminating agents present inside the duct, to outside the duct via these small fissures or non-hermetic joints.

Alternatively, in particular in the case of ducts with a small cross-section, in accordance with a further embodiment, the ventilation means may also consist of a compressed gas source able to produce the conveying flow at a flowrate with maximum turbulence, directly emitting it via orifices provided on the gun body.

In order to treat new sections of the air distribution network using the sanitization method it is sufficient to perform identification of the new ducts to be treated, as shown in FIG. 3 where the section 2a, 2b, 2d is considered, and in each case close the previous outlet openings and remove the plug 6 from one of the openings previously closed in order to convey the process air towards it.

A preferred example of calculation of the pair of values for the air flowrate and average droplet size based on the measurement data of a specific duct to be treated will now be provided hereinbelow, in the form of graphs resulting from mathematical formulations able to describe the deposition of an aerosol in an air flow with maximum turbulence.

It must considered, however, that a person skilled in the art may easily obtain the distribution of the droplets on the surfaces of a duct, based on the geometric data of the latter, using both test results and theoretical calculations which are described in particular in the report published by the Lawrence Berkley National Laboratory (LBNL-51432) entitled "Particle deposition from turbulent flow: review of published research and its applicability to ventilation ducts in commercial buildings" written by Mark R. Sippola and William W. Nazaroff, and regarded as incorporated here by way of reference.

The operational parameters which control the deposition process are the average size of the aerosol droplets and the local speed of the air which, together with the size and the geometric form of the duct, define the intensity and the form of the turbulent structures acting on the walls. The local speed of the air (and hence air flowrate set in the modulating/ventilating unit) and average size of the droplet produced by the spray gun therefore form the pair of control variables which ensure the desired outcome of the deposition process.

The person skilled in the art may define the values of the operational parameters—local speed and droplet size—which determine the speed values for deposition on the walls of the ducts by applying the mathematical equations contained in the Lawrence publication. Alternatively the person skilled in the art may reconstruct an empirical table with the operational parameters by verifying the distribution of the aerosol obtained over various ducts.

The tests may be carried out, for example, choosing values for the droplet size in the range of 10-80 μm, local air speed of between 2-20 m/s and amount of aerosol polymer of between 0.1 and 3 kg per $m^2$ of duct.

Small deviations from the optimum values result in major variations in the deposition process performed, which is evaluated on the basis of the deposition efficiency, i.e. the fraction of product deposited on the inner walls of the duct, the continuity of the coating, i.e. the distribution of the product over all the walls of the duct including the horizontal top wall, and the uniformity of the coating produced, i.e. the regularity of distribution of the product along the relevant duct section to be treated.

Satisfactory results may be obtained by adopting suitable combinations of values in the range of 10-80 μm, for the average size of the atomized droplets, and in the range of 2-20 m/s for the local speed of the air inside the duct.

In order to ensure a good yield during the process of deposition over the inner walls of the air-conveying duct, it is therefore necessary to define the operating conditions which ensure high values of deposition efficiency. It should be commented, however, that, in order for the coating treatment to be considered satisfactory, it is necessary, as mentioned, for it to be performed in a uniform manner over the treated surfaces and as homogeneously as possible along the axial length of the duct. Operating conditions which, although producing high values for the high deposition efficiency, result in the deposition of nearly all the product within the first few meters of the duct treated are to be regarded as unsuitable.

It is therefore necessary to pursue a dual objective, namely the highest possible deposition efficiency in keeping with the most homogeneous distribution of the product. The aim, therefore, is to achieve those operating conditions which ensure the most similar values for speed of deposition over the four walls of the duct and which result in the most uniform possible values for deposition along the length of the duct.

The operating conditions may be fully determined within the volumetric flow of air conveyed by the section of air-conveying network to be treated and by the dimensions of the droplets forming the aerosol which ideally consists of a monodispersion.

In order to obtain an overview of the changes produced in deposition by the variation in the process operating conditions, a series of calculation sheets or easy-to-use graphs were prepared, these reconstructing the theoretical curves relating to the expected deposition within a duct of given geometric form upon variation in the formulated air flowrate and the size of the droplets produced by the aerosol generating apparatus.

In order to allow selection of the operating conditions to be used, each calculation sheet acquires, as the input variables, the characteristic parameters of the air-conveying network section to be treated.

To summarise, the mathematical model, for a variation in the volumetric flow of the process air and size of the atomized particles, simulates the outcome of deposition within the duct by processing the data relating to the geometric form of the duct, namely diameter or width and height of the through-flow section of the duct, and length of duct section to be treated.

Since the temperature, specific weight, dynamic viscosity of the air conveyed inside the duct and the specific weight of the atomized liquid are variables which influence the model, they are, however, preferably kept constant for the duration of the treatment in progress, once the film-forming product to be used has been chosen, when implementing the method in question.

As previously mentioned, the value of the deposition efficiency on its own is not sufficient to establish whether the deposition process obtained may be suitable for the technological application used for the internal coating of the duct, but it also seems necessary to be able to define the degree of uniformity of deposition which is to be achieved in the generic through-flow section of the duct. Lower deposition values are envisaged on the horizontal deposition surface at the top of the duct, while the highest values are expected along the horizontal bottom wall.

Therefore, the value of the ratio between the deposition speeds at the top and at the bottom of the duct is indicative of the degree of homogeneity of deposition over the generic through-flow section, and the higher and closer to unity it is, the better the uniformity of coating of the duct.

It is therefore possible to discard the pairs of air flowrate/droplet size values for which the ratio between the values of the deposition speeds achieved, calculated for the top and bottom walls, respectively, is less than an arbitrary limit value and which would therefore result in deposition phenomena with an insufficient degree of homogeneity.

Figure 4:
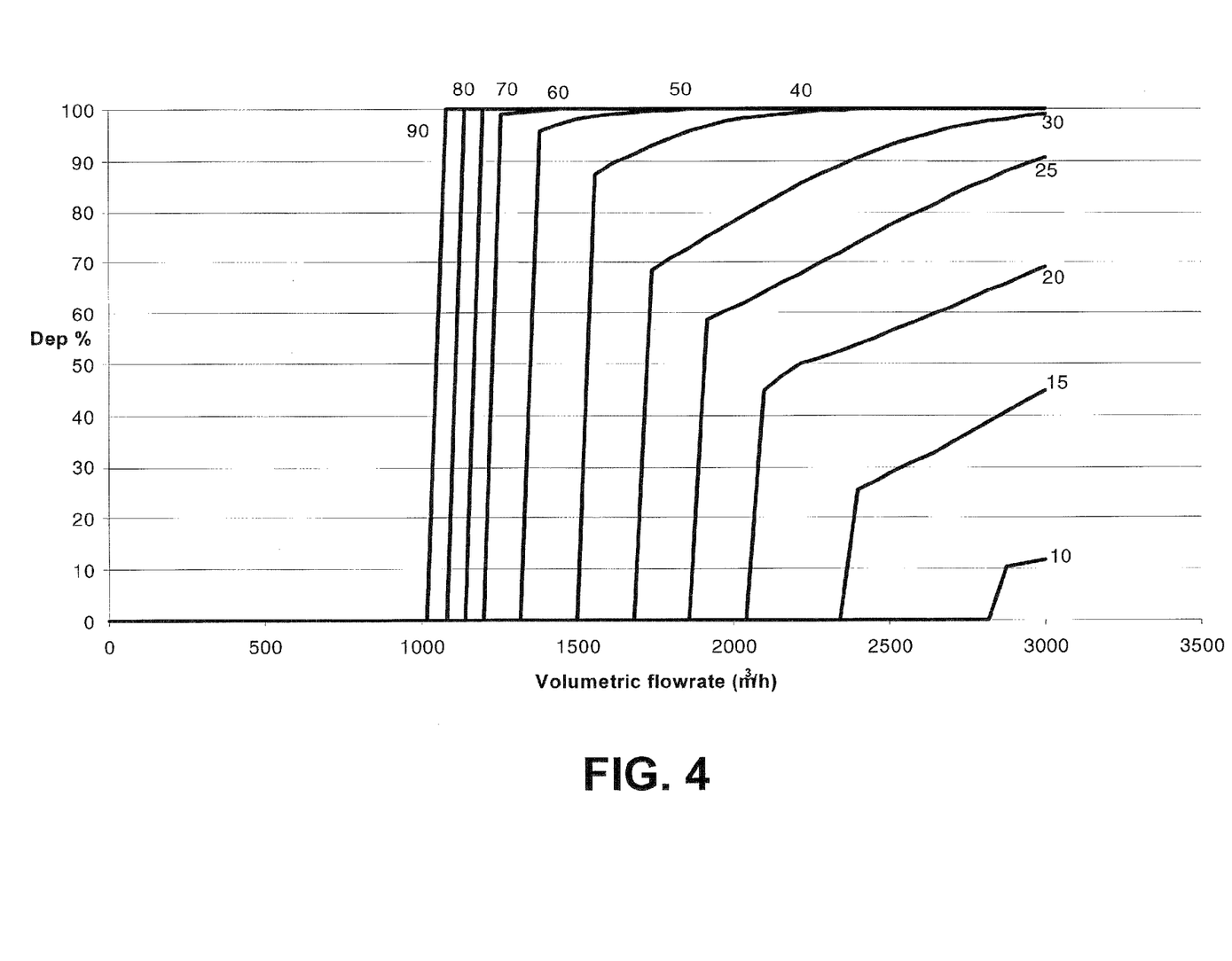
FIG. 4 is Graph No. 1 for a rectangular duct with dimensions of 0.3×0.2 m and a length of 9 m.

By defining, for example, a limit value of six percent, FIG. 4, Graph No. 1 is obtained, for a rectangular duct with dimensions of 0.3×0.2 m and length 9 m, this showing therefore all the operating conditions able to ensure a treatment which produces a coating of the duct considered to be acceptably uniform.

Having thus chosen a suitable combination of values for the air flow rate and droplet size, it is possible to calculate, knowing the expected deposition efficiency, the quantity of product needed to obtain a desired average thickness of film in the liquid phase. Knowing the extension of the deposition surface $A_{dep}$, the value of the thickness of the coating to be obtained by means of turbulent deposition $S_{dep}$ and the specific weight of the product to be sprayed $\rho_1$, whereby Dep indicates the deposition efficiency, the mass Mc of product required by the process is calculated by means of the following equation:

$$M_c = \frac{A_{dep} \cdot S_{dep} \cdot \rho_1}{Dep}$$

From an analysis of the above graphs it would therefore seem appropriate to employ large droplet dimensions, able to ensure high deposition efficiency values and at the same time the highest levels of homogeneous treatment over the individual through-flow section. However, plotting the progression of the deposition efficiency against the distance, from the entry section, of the aerosol inside the duct for different droplet size values, it can be seen how, when employing droplets with a high inertia, high deposition values are obtained to the detriment of distribution of the coating thickness which varies greatly in the flow direction, i.e. large depositions of product are obtained, although they are localized only in the first section of the duct. On the other hand, aerosols consisting of minute droplets produce smaller depositions which however result in the formation of coating thicknesses which are more uniform in the direction of the axial extension of the duct.

Therefore, each operating point defined between the points shown in Graph No. 1 will produce a continuous coating of the through-flow section, but different pairs of values for the volumetric flow/average aerosol droplet size are not equivalent for the purposes of uniformity of coating along the duct.

In the case of the duct considered for example, if preference is to be given to the deposition efficiency, it would be possible to choose, for example, the operating point defined by the pair of values 40 μm-1,700 m$^3$/h able to ensure a deposition efficiency of 95.4% providing an average speed of flow through the duct of 7.87 m/s.

Figure 5:
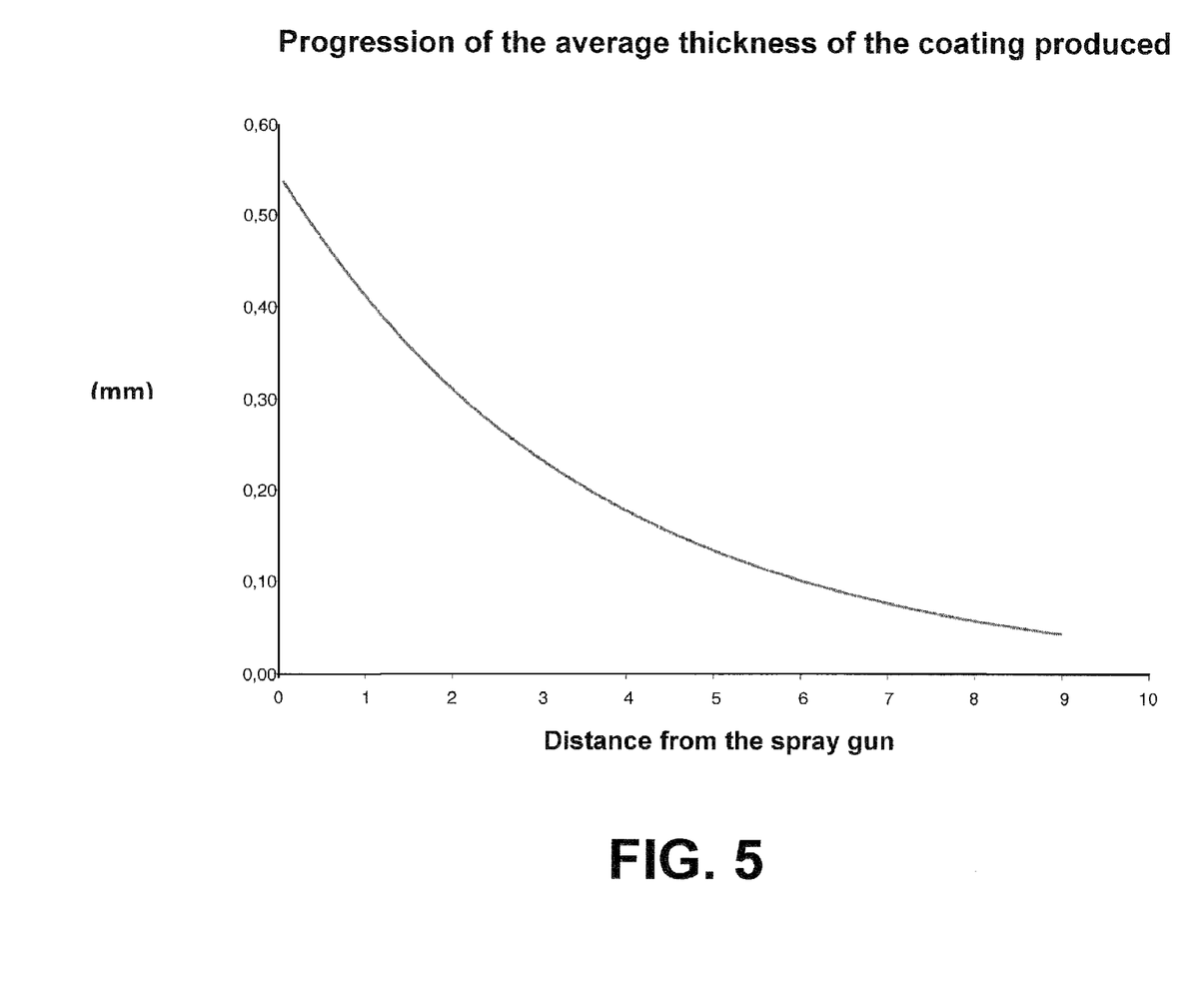
FIG. 5 is Graph No. 2, which shows expected average thickness along the generic through-flow section against the distance from the spraying gun.

If an average thickness of 0.2 mm is to be provided, it would be required to use for treatment 1.96 kg of product (as determined from the above equation), of which only 0.16 kg would not be deposited at the end of the duct, resulting, however, in poor coating uniformity, as can be seen in FIG. 5, Graph No. 2, which shows the expected average thickness along the generic through-flow section against the distance from the spraying gun.

Vice versa, if the operating point defined by the values 20 μm-2,200 m$^3$/h is employed, a deposition efficiency of 50.6% substantially inferior to that above is obtained with a process air flowrate conveyed at an average speed of 10.2 m/s.

Figure 6:
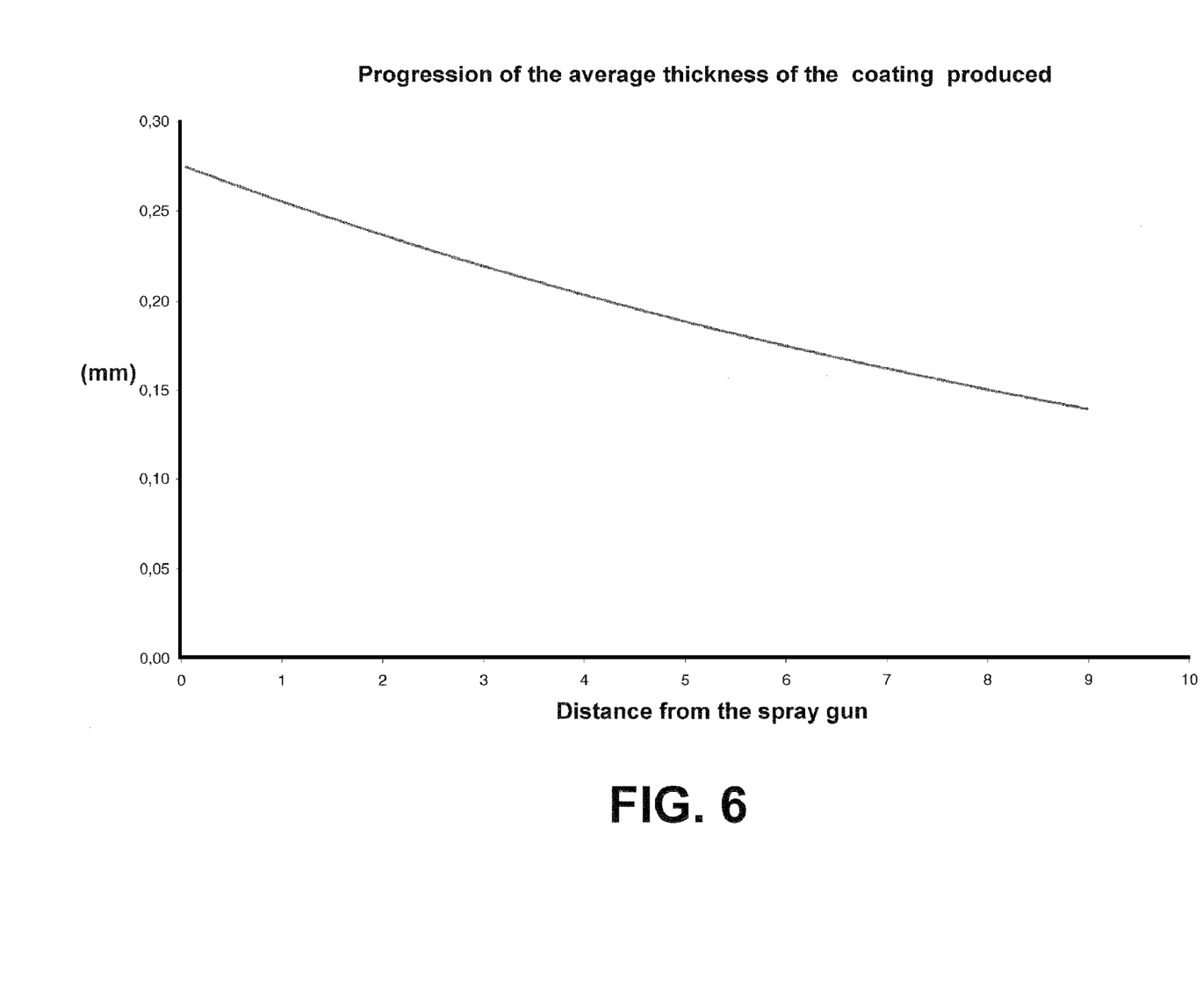
FIG. 6 is Graph No. 3 which shows the degree of uniformity of the coating.

The product consumption required in order to obtain the same nominal average thickness is greater than that in the previous example, i.e. 3.64 kg, and the quantity of product not yet deposited along the section at nine meters from the spray gun is this time equal to 1.84 kg. However, the degree of uniformity of the coating is substantially better and certainly more suitable for effective treatment of the duct considered, as can be seen in FIG. 6, Graph No. 3.

Basically, it is clear how the choice of operating conditions to be employed cannot be performed solely on the basis of seeking the maximum deposition efficiency, but must be the result of a careful compromise between deposition efficiency, and hence cost of the operation, and quality of deposition, understood as meaning the compliance of the coating obtained with the necessary thickness requirements so that the treatment performed may be regarded as effective.

The mathematical calculation model for predicting the distribution of the droplets of product may be conveniently converted into a plurality of tables able to provide, for different data relating to the geometric form of the duct to be treated, directly at least one choice of values for air flowrate, average particle size of the film-forming product and duration of the aerosol generating step.

These tables may also be obtained by experimental means rather than by analytical methods.

Obviously, the present invention may also be used along new ducts for ensuring the initial hygienic conditions thereof.

The method thus conceived therefore achieves the predefined objects.

Obviously, it may also assume, in its practical embodiment, forms and configurations different from that illustrated above without thereby departing from the present scope of protection.

Moreover, all the details may be replaced by technically equivalent elements and the dimensions, the forms and the materials used may be of any nature according to requirements.

The invention claimed is:

1. Method for reconditioning air conveying or processing ducts, comprising the following operating steps:
    selecting at least one duct section to be treated, situated between at least one first and one second opening;
    closing any different openings in communication with said duct section to be treated and different from said first opening and said second opening;
    generating, by ventilation, a flow of conveying air with maximum turbulence and a predefined flowrate flowing between said first opening and said second opening, whereby said step involving closing of said openings results in said air flow not being influenced by any said different openings in communication with said duct section to be treated, and which are situated between said first and said second openings;
    generating, by atomization, an aerosol of a film-forming product, having liquid droplets of predetermined average size, within said air flow in the vicinity of an upstream section of the duct to be treated relative to the direction of movement of the air flow;
    depositing said droplets of product, still in the liquid phase, onto the inner surface of the section of duct to be treated with formation of a substantially uniform and continuous liquid film;
    crosslinking said liquid film with formation of a substantially uniform and continuous solid coating;
    wherein said generating a flow of conveying air is performed by means of creation of a vacuum inside the duct to be treated, obtained by providing suction ventilation in the region of said second opening.

2. Method according to claim 1, characterized in that it also comprises:
    determining the duct to be treated so as to acquire measurement data identifying its geometric form, including its cross-section and its length;
    calculating by which said measurement data are converted, using a model relating to deposition of aerosol in an air flow with maximum turbulence, into at least one pair of values for the flowrate and average droplet size, respectively, able to produce firstly said liquid film and then said solid coating such that it is substantially continuous and uniform on the inner surface of the duct section to be treated;
    said calculating involving generation of the flow of conveying air and said aerosol generating step being performed by defining said pair of values for the flowrate and average droplet size, respectively.

3. Method according to claim 1, characterized in that said step for generating a flow of conveying air produces a predetermined flowrate which is substantially constant.

4. Method according to claim 1, characterized in that said first opening is passed through by said incoming air flow and said second opening is passed through by said outgoing air flow and in that said outgoing air flow is subject to a cleaning step for removal of the substances suspended inside it prior to being discharged into the environment.

5. Method according to claim 1, characterized in that said flowrate values are chosen by defining the average speed in all the sections of the duct to be treated such that it lies within the range of 2-20 m/s.

6. Method according to claim 1, characterized in that said average dimensional values of the atomized droplets are chosen in the range of 10-80 µm.

7. Method according to claim 1, characterized in that the duration of said aerosol generating step is obtained by said model for said measurement data of the duct to be treated and for said pair of values indicating the air flowrate and the average dimensional size of the particles by defining a given average coating thickness of the duct.

8. Method according to claim 1, wherein, during said crosslinking, drying the liquid film is performed by generation of a flow of drying air in the section of duct to be treated.

9. Method according to claim 8, characterized in that said flow of drying air is at a temperature higher than said flow of conveying air.

10. Method according to claim 1, characterized in that said crosslinking step lasts for a solidification period during which subsequent steps of deposition of said droplets of product in the liquid phase on the prior liquid film result in combined crosslinking of all the product deposited on the inner surface of the duct section to be treated.

11. Method according to claim 1, characterized in that said film-forming product comprises at least one formulation based on epoxide compounds.

12. Method for reconditioning air conveying or processing ducts, comprising the following operating steps:
    selecting at least one duct section to be treated, situated between at least one first and one second opening;
    closing any different openings in communication with said duct section to be treated and different from said first opening and said second opening;
    generating, by ventilation, a flow of conveying air with maximum turbulence and a predefined flowrate flowing between said first opening and said second opening, whereby said step involving closing of said different openings results in said air flow not being influenced by any of said different openings situated between said first and said second openings;
    generating by atomization, an aerosol of a film-forming product, having liquid droplets of predetermined average size, within said air flow in the vicinity of an upstream section of the duct to be treated relative to the direction of movement of the air flow;
    depositing said droplets of product, still in the liquid phase, onto the inner surface of the section of duct to be treated with formation of a substantially uniform and continuous liquid film;
    crosslinking said liquid film with formation of a substantially uniform and continuous solid coating;
    characterized in that said first opening is passed through by said incoming air flow and said second opening is passed through by said outgoing air flow and in that said outgoing air flow is subject to a cleaning step for removal of the substances suspended inside it prior to being discharged into the environment;
    characterized in that said generation of a flow of conveying air is performed by creation of a vacuum inside the duct to be treated, and characterized in that said vacuum is obtained by arranging suction ventilation means in the region of said second opening.

* * * * *